Patented Apr. 5, 1949

2,466,397

UNITED STATES PATENT OFFICE 2,466,397

MONOAZO HETEROCYCLIC COMPOUNDS

Joseph B. Dickey, Rochester, N. Y., assignor to Eastman Kodak Company, Rochester, N. Y., a corporation of New Jersey No Drawing. Application December 13, 1947,
Serial No. 791,657

6 Claims. (Cl. 260—154)

This invention relates to new monoazo heterocyclic compounds and their application to the dyeing or coloring art. The new compounds are particularly of value for the coloration of textile materials made of or containing a cellulose alkylcarboxylic acid ester, in which ester the acid radicals contain from two to four carbon atoms. They also possess some utility for the coloration of textile materials made of cotton, wool, silk, or nylon.

The cellulose alkyl carboxylic acid esters which may be dyed or colored include the hydrolyzed as well as the unhydrolyzed cellulose alkyl carboxylic acid esters such as cellulose acetate, cellulose propionate, or cellulose butyrate and the hydrolyzed as well as the unhydrolyzed mixed cellulose alkyl carboxylic acid esters such as cellulose acetate-propionate and cellulose acetate-butyrate.

The new azo compounds by means of which the objects of my invention are accomplished or made possible have the formula:

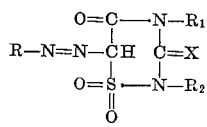

wherein R represents the residue of a monocyclic aryl nucleus of the benzene series, $R_1$ and $R_2$ each stand for a member selected from the group consisting of a hydrogen atom, an alkyl group having from one to four, inclusive, carbon atoms, a hydroxyalkyl group having from two to three, inclusive, carbon atoms, an alkoxyalkyl group having three to four, inclusive, carbon atoms, the phenyl group and the benzyl group, and X represents a member selected from the group consisting of an oxygen atom and a sulfur atom.

The monoazo heterocyclic compounds of my invention can be prepared by coupling in an alkaline medium a diazotized monocyclic aminobenzene compound with a heterocyclic coupling compound having the formula:

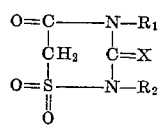

wherein $R_1$, $R_2$, and X have the meanings previously assigned to them.

The nuclear non-sulfonated azo compounds of my invention are particularly of value as dyes for the coloration of the cellulose alkyl carboxylic-acid ester textile materials indicated hereinbefore. They are especially of value for the coloration of cellulose acetate textile materials. The azo compounds of my invention may be generally employed, whether sulfonated or non-sulfonated, for the coloration of silk, wool and nylon. However, for the coloring of these latter materials it has been found that the acidic sulfonated derivatives are more advantageously employed owing to their greater affinity for these fibers. From the foregoing it will be seen that by the use of a nuclear non-sulfonated dye, a cellulose alkyl carboxylic acid ester, silk, wool, or nylon may be dyed or mixtures of any two of these textile materials may be dyed. Similarly, it will be apparent that mixtures of the above materials may be colored by employing a mixture of sulfonated and nuclear non-sulfonated dye compounds.

This invention, then, has for an object the production of new azo dye compounds. Another object is to provide new azo dye compounds useful for the coloration of the textile materials hereinbefore named and especially for the coloration of cellulose alkyl carboxylic acid esters. A further object is to provide a process for preparing the new azo compounds of my invention. A still further object is to provide a process for the coloration of cellulose alkyl carboxylic acid esters. Another object is to provide colored cellulose alkyl carboxylic acid ester textile materials which possess good fastness to light and washing. A specific object is to provide colored cellulose acetate textile materials which possess good fastness to light and washing.

The following examples illustrate the new azo compounds of my invention and the manner of preparing them.

EXAMPLE 1

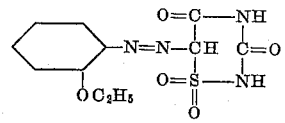

13.7 grams of o-phenetidine are added to 150 cc. of water containing 25 cc. of 36% hydrochloric acid. The resulting solution is cooled to a temperature approximating 0.5° C. by the addition of ice, for example, and the o-phenetidine is diazotized while maintaining this temperature by adding, with stirring, 6.9 grams of sodium nitrite dissolved in water.

16.4 grams of

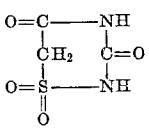

are dissolved in 200 cc. of water containing 30 grams of sodium carbonate. The resulting solution is cooled to a temperature of 0–10° C. by the addition of ice, for example, and the diazonium compound prepared as described above is slowly added with stirring. Upon completion of the coupling reaction which takes place and which is carried out while maintaining a temperature of 0–10° C., the mixture is made acid to litmus by the addition of a mineral acid such as hydrochloric acid, and the dye compound formed is recovered by filtration, washed with water, and dried. It colors cellulose acetate and nylon yellow shades from an aqueous suspension of the dye.

EXAMPLE 2

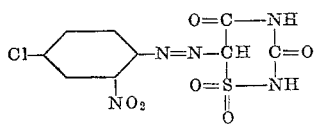

17.2 grams of o-nitro-p-chloroaniline are diazotized in accordance with the procedure described for o-phenetidine in Example 1.

16.4 grams of

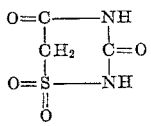

are dissolved in 200 cc. of water containing 10 grams of sodium hydroxide and coupled in accordance with the procedure described in Example 1 with the diazonium compound prepared as described above. The resulting azo dye compound colors cellulose acetate and nylon yellow shades.

EXAMPLE 3

10.9 grams of o-aminophenol are added to 150 cc. of water to which has been added 25 cc. of 36% hydrochloric acid. The resulting solution is diazotized while maintaining a temperature of 0–10° C. by adding, with stirring, a water solution of 6.9 grams of sodium nitrite.

16.4 grams of the heterocyclic coupling compound employed in Example 1 are dissolved in 200 cc. of water containing 30 grams of sodium carbonate. The resulting solution is cooled to a temperature of 0–10° C. and the diazo solution prepared as described above is slowly added with stirring. Upon completion of the coupling reaction which takes place, the mixture is made acid to litmus with hydrochloric acid following which the precipitated dye compound is recovered by filtration, washed with water, and dried. The dye compound obtained has the formula:

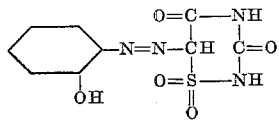

and colors cellulose acetate yellow shades.

EXAMPLE 4

18.1 grams of o-nitro-p-carboxyaniline are diazotized in known fashion. The solution of diazonium compound obtained is added slowly with stirring to a dilute alkaline aqueous solution of 16.4 grams of the heterocyclic coupling compound employed in Example 1 while maintaining a temperature of 0–10° C. Upon completion of the coupling reaction which occurs, the dye compound formed is salted out with sodium chloride, recovered by filtration, washed with small portions of ice water, and dried. The azo dye thus obtained has the formula:

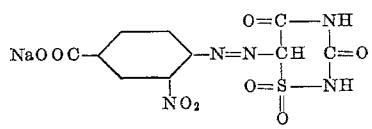

and colors cellulose acetate yellow shades.

EXAMPLE 5

16.8 grams of o-nitro-p-methoxyaniline are added to 150 cc. of water to which has been added 25 cc. of 36% hydrochloric acid, and the resulting mixture is diazotized at 0–10° C. in the usual manner by the addition, with stirring, of a water solution of 6.9 grams of sodium nitrite.

16.4 grams of the heterocyclic coupling compound employed in Example 1 are dissolved in 200 cc. of water containing 30 grams of sodium carbonate. The resulting solution is cooled to 0–10° C. and the diazo solution formed above is slowly added with stirring. Upon completion of the coupling reaction which occurs, the mixture is made acid to litmus by the addition of hydrochloric acid, and the precipitated dye compound is recovered by filtration, washed with water, and dried. The dye compound obtained has the formula:

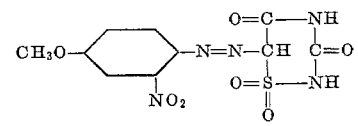

and colors cellulose actate yellow shades.

EXAMPLE 6

21.7 grams of 3-nitro-4-aminobenzene sulfonic acid and 4 grams of sodium carbonate in 125 cc. of water are added to 50 cc. of 10% hydrochloric acid in ice water. A water solution of 6.9 grams of sodium nitrite is then added, with stirring, to effect diazotization.

19.2 grams of the compound:

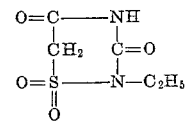

are dissolved in 200 cc. of water containing 30 grams of sodium carbonate. The resulting solution is cooled to a temperature of 0–10° C., and the diazo solution prepared above is slowly added with stirring. Upon completing of the coupling reaction which takes place, the precipitated dye compound is recovered by filtration, washed with water, and dried. The azo dye obtained has the formula:

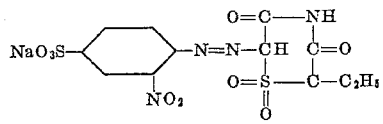

and colors silk, wool, and nylon yellow shades from an aqueous solution of the dye.

Example 7

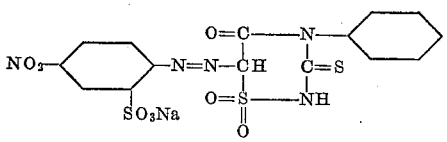

21.7 grams of 5-nitro-2-aminobenzene-sulfonic acid are diazotized in known fashion and the diazonium compound obtained is coupled with 25.7 grams of

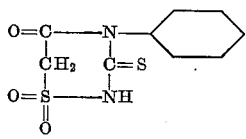

The coupling reaction and recovery of the dye compound may be carried out as described in Example 6. The dye compound obtained colors silk, wool, and nylon yellow shades from an aqueous solution of the dye that may contain salt. Dyes of this type can be chromed.

Example 8

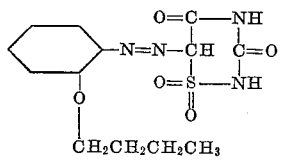

16.5 grams of o-n-butoxyaniline are diazotized in known fashion and the diazonium compound obtained is coupled in an alkaline medium with 16.4 grams of

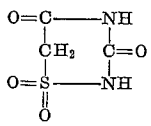

The dye compound obtained colors cellulose acetate yellow shades.

Example 9

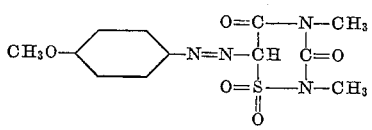

12.3 grams of p-anisidine are diazotized in the usual manner and the diazonium compound obtained is coupled in an alkaline medium with 19.2 grams of

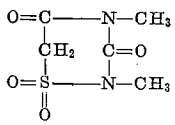

The dye compound obtained colors cellulose acetate yellow shades.

Example 10

12.3 grams of o-anisidine are diazotized in accordance with the procedure described in Example 1 for the diazotization of o-phenetidine. The solution of diazonium compound thus obtained is added slowly, with agitation, to a solution of 20.8 grams of

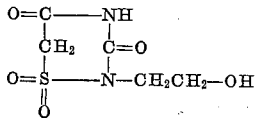

in 200 cc. of water containing 30 grams of sodium carbonate while maintaining a temperature of 0–10° C. Upon completion of the coupling reaction which takes place, the mixture is acidified with dilute hydrochloric acid. The precipitated dye product is collected on a suction filter, washed with water, and dried. The azo compound obtained has the formula:

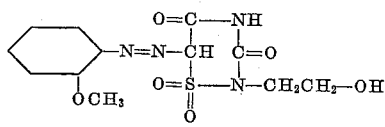

and colors cellulose acetate yellow shades.

Example 11

15.3 grams of o-nitro-p-hydroxyaniline are added to 100 cc. of water containing 40 cc. of 36% hydrochloric acid. The resulting solution is cooled to 10° C. and diazotized at this temperature by adding, with stirring, a water solution of 6.9 grams of sodium nitrite.

22.0 grams of

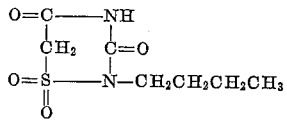

are dissolved in 200 cc. of water containing 30 grams of sodium carbonate. The resulting solution is cooled to a temperature of 0–10° C., and the diazo solution prepared as described above is slowly added, with stirring. When the coupling reaction which occurs is complete, the mixture is made acid to litmus with hydrochloric acid, and the precipitated dye compound is recovered by filtration, washed with water, and dried. The dye compound formed has the formula:

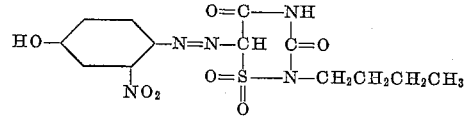

and colors cellulose acetate yellow shades.

Example 12

13.7 grams of o-nitroaniline are added to 100 cc. of water containing 40 cc. of 36% hydrochloric acid. The resulting solution is diazotized in the usual manner by adding a water solution of 6.9 grams of sodium nitrite slowly with stirring while maintaining a temperature of 0–10° C.

23.8 grams of

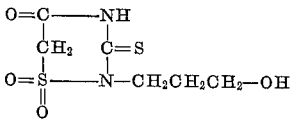

are dissolved in 200 cc. of water containing 30 grams of sodium carbonate. To this solution is added the diazonium solution prepared above with stirring at a temperature of 0–10° C. Upon completion of the coupling reaction which occurs the mixture is acidified with a mineral acid such as hydrochloric acid, and the precipitated product is recovered by filtering, washed with water, and dried. The azo dye obtained has the formula:

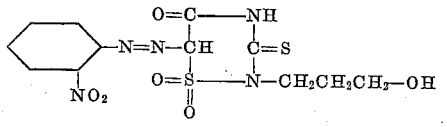

and colors cellulose acetate yellow shades.

Example 13

15.1 grams of o-nitro-p-methylaniline are diazotized in the usual manner, and the resulting solution of diazonium compound is coupled with 23.8 grams of

```
O=C-----NH
  |      |
  CH2    C=O
  |      |
O=S------N-CH2CHCH2
  ||         /    \
  O         OH    OH
``` which are dissolved in 200 cc. of water containing 30 grams of sodium carbonate. When the coupling reaction is complete, the mixture is made acid to litmus by adding hydrochloric acid following which the precipitated dye compound is recovered by filtration, washed with water, and dried. The azo dye obtained has the formula:

```
              O=C-----NH
                |      |
CH3-<  >-N=N-CH    C=O
       |        |      |
       NO2    O=S------N-CH2CHCH2
              ||         /    \
              O         OH    OH
``` and colors cellulose acetate yellow shades.

Example 14

21.5 grams of 3-nitro-4-aminophenylmethyl sulfone are diazotized in the usual manner, and the resulting diazonium compound is coupled in alkaline solution with 18.0 grams of

```
O=C-----NH
  |      |
  CH2    C=S
  |      |
O=S------NH
  ||
  O
```

The azo dye compound recovered by filtration from the acidified reaction mixture colors cellulose acetate yellow shades.

Example 15

13.7 grams of p-phenetidine are diazotized in the usual manner, and the resulting diazonium compound is coupled in alkaline solution with 25.2 grams of the compound

```
O=C-----N-CH2CH2-OH
  |      |
  CH2    C=O
  |      |
O=S------N-CH2CH2-OH
  ||
  O
```

The azo dye compound recovered from the acidified reaction mixture by the method of Example 1 colors cellulose acetate yellow shades.

Example 16

20.5 grams of o-nitro-p-trifluoromethylaniline are diazotized in known fashion and the resulting solution of diazonium compound is added slowly, with stirring, to 200 cc. of aqueous alkaline solution containing 18.0 grams of

```
O=C-----NH
  |      |
  CH2    C=O
  |      |
O=S------N-CH3
  ||
  O
```

After the coupling reaction, which occurs, is complete, the mixture is made acid to litmus with hydrochloric acid. The azo dye which precipitates is collected on a suction filter, washed with water, and dried. The compound obtained has the formula:

```
              O=C-----NH
                |      |
CF3-<  >-N=N-CH    C=O
       |        |      |
       NO2    O=S------N-CH3
              ||
              O
``` and colors cellulose acetate yellow shades.

Example 17

13.7 grams of p-nitroaniline are diazotized in the usual manner, and the solution of diazonium compound obtained is coupled in alkaline solution with 28.0 grams of

```
O=C-----N-CH2CH2CH2CH3
  |      |
  CH2    C=O
  |      |
O=S------N-CH2CH2CH2CH3
  ||
  O
```

Upon completion of the coupling reaction the mixture is acidified, and the precipitate is recovered by filtration, washed with water, and dried. The azo dye compound thus prepared has the formula:

```
              O=C-----N-CH2CH2CH2CH3
                |      |
NO2-<  >-N=N-CH    C=O
              |        |
              O=S------N-CH2CH2CH2CH3
              ||
              O
```

Example 18

18.0 grams of o-nitro-p-carboxamidoaniline are diazotized according to the procedure described for o-phenetidine in Example 1, and the solution of diazonium compound obtained is coupled in alkaline solution at 0-10° C. with 24.1 grams of

```
O=C-----N-<  >
  |      |
  CH2    C=O
  |      |
O=S------NH
  ||
  O
```

The coupling reaction and recovery of the product are carried out as described in Example 1. The dye compound isolated colors cellulose acetate yellow shades.

Example 19

21.6 grams of o-nitro-p-bromoaniline are diazotized in the usual manner, and the solution of diazonium compound formed is coupled in alkaline solution at 0-10° C. with 23.6 grams of

```
O=C-----N-CH2CH3
  |      |
  CH2    C=S
  |      |
O=S------N-CH2CH3
  ||
  O
```

The resulting azo dye compound recovered from the acidified reaction mixture by filtration colors cellulose acetate yellow shades.

Example 20

21.6 grams of 3-nitro-4-aminobenzene sulfonamide are diazotized in known manner and the resulting diazonium compound is coupled with 19.6 grams of

```
O=C-----NH
  |      |
  CH2    C=S
  |      |
O=S------N-CH3
  ||
  O
``` using the procedure for the coupling reaction and recovery of the product which is described for the dye obtained in Example 1. The azo dye compound isolated colors cellulose acetate yellow shades.

EXAMPLE 21

21.7 grams of 2-amino-5-nitrobenzene sulfonic acid and 4 grams of sodium carbonate in 125 cc. of water are added to 50 cc. of 10% hydrochloric acid in ice water. A water solution of 6.9 grams of sodium nitrite is then added, with stirring, to effect diazotization.

20.8 grams of the compound $$\begin{array}{c} O=C\!\!-\!\!-\!\!-\!\!N\!\!-\!\!CH_3 \\ | \quad\quad | \\ CH_2 \quad\quad C=S \\ | \quad\quad | \\ O=S\!\!-\!\!-\!\!-\!\!-\!\!N\!\!-\!\!CH_3 \\ \| \\ O \end{array}$$

are dissolved in 200 cc. of water containing 30 grams of sodium carbonate. The resulting mixture is cooled to 0–10° C., and the diazo solution prepared above is slowly added with stirring. Upon completion of the coupling reaction which takes place, the precipitated dye compound is recovered by filtration, washed with water, and dried. The azo dye obtained has the formula:

$$NO_2\!\!-\!\!\bigcirc\!\!-\!\!\underset{SO_3Na}{}\!\!-\!\!N\!\!=\!\!N\!\!-\!\!\begin{array}{c} O=C\!\!-\!\!N\!\!-\!\!CH_3 \\ | \quad | \\ CH \quad C=S \\ | \quad | \\ O=S\!\!-\!\!-\!\!N\!\!-\!\!CH_3 \\ \| \\ O \end{array}$$

and colors silk, wool, and nylon yellow shades from an aqueous solution of the dye.

EXAMPLE 22

18.7 grams of 3-methyl-4-aminobenzene sulfonic acid are diazotized, and the diazonium compound formed is coupled with 22.2 grams of $$\begin{array}{c} O=C\!\!-\!\!-\!\!N\!\!-\!\!H \\ | \quad | \\ CH_2 \quad C=O \\ | \quad | \\ O=S\!\!-\!\!-\!\!N\!\!-\!\!CH_2CH_2\!\!-\!\!OCH_3 \\ \| \\ O \end{array}$$

The coupling reaction and recovery of the product are carried out according to the procedure described in Example 21. The resulting acidic azo dye compound colors wool, silk, and nylon yellow shades from an aqueous solution of the dye which may contain salt. It has the formula:

$$NaO_3S\!\!-\!\!\bigcirc\!\!-\!\!\underset{CH_3}{}\!\!-\!\!N\!\!=\!\!N\!\!-\!\!\begin{array}{c} O=C\!\!-\!\!N\!\!-\!\!H \\ | \quad | \\ CH \quad C=O \\ | \quad | \\ O=S\!\!-\!\!-\!\!N\!\!-\!\!CH_2CH_2\!\!-\!\!OCH_3 \\ \| \\ O \end{array}$$

EXAMPLE 23

23.1 grams of 2-amino-5-nitrobenzene methylsulfonamide are added to 100 cc. of water containing 40 cc. of 36% hydrochloric acid. The resulting solution is diazotized in the usual manner by adding a water solution of 6.9 grams of sodium nitrite slowly with stirring while maintaining a temperature of 0–10° C.

25.2 grams of $$\begin{array}{c} O=C\!\!-\!\!-\!\!N\!\!-\!\!H \\ | \quad | \\ CH_2 \quad C=S \\ | \quad | \\ O=S\!\!-\!\!-\!\!N\!\!-\!\!CH_2CH_2\!\!-\!\!OCH_2CH_3 \\ \| \\ O \end{array}$$

are dissolved in 200 cc. of water containing 30 grams of sodium carbonate. To this solution is added the diazonium solution prepared above, with stirring, at a temperature of 0–10° C. Upon completion of the coupling reaction which occurs the mixture is acidified with hydrochloric acid, and the precipitated product is recovered by filtering, washed with water, and dried. The azo dye obtained has the formula:

$$O_2N\!\!-\!\!\bigcirc\!\!-\!\!\underset{SO_2NHCH_3}{}\!\!-\!\!N\!\!=\!\!N\!\!-\!\!\begin{array}{c} O=C\!\!-\!\!N\!\!-\!\!H \\ | \quad | \\ CH \quad C=S \\ | \quad | \\ O=S\!\!-\!\!-\!\!N\!\!-\!\!CH_2CH_2\!\!-\!\!OCH_2CH_3 \\ \| \\ O \end{array}$$

and colors cellulose acetate yellow shades.

EXAMPLE 24

12.3 grams of p-anisidine are diazotized in the usual manner and the resulting solution of diazonium compound is coupled in alkaline solution with 25.5 grams of $$\begin{array}{c} O=C\!\!-\!\!-\!\!NH \\ | \quad | \\ CH_2 \quad C=O \\ | \quad | \\ O=S\!\!-\!\!-\!\!N\!\!-\!\!CH_2\!\!-\!\!\bigcirc \\ \| \\ O \end{array}$$

The azo dye compound recovered by filtration from the acidified reaction mixture colors cellulose acetate yellow shades.

EXAMPLE 25

15.1 grams of p-nitro-o-toluidine are diazotized in the usual manner and the resulting solution of diazonium compound is added with stirring to a dilute alkaline solution of 27.1 grams of $$\begin{array}{c} O=C\!\!-\!\!-\!\!NH \\ | \quad | \\ CH_2 \quad C=S \\ | \quad | \\ O=S\!\!-\!\!-\!\!N\!\!-\!\!CH_2\!\!-\!\!\bigcirc \\ \| \\ O \end{array}$$

while maintaining a temperature of 0–10° C. Upon completion of the coupling reaction which occurs the mixture is acidified, and an azo dye compound is recovered by filtration which colors cellulose acetate yellow shades.

The following azo dye compounds are also prepared using the procedure indicated hereinbefore. Each of these azo dye compounds colors cellulose acetate yellow shades.

26.
$$C_2H_5NSO_2\!\!-\!\!\bigcirc\!\!-\!\!\underset{NO_2}{\overset{H}{}}\!\!-\!\!N\!\!=\!\!N\!\!-\!\!\begin{array}{c} O=C\!\!-\!\!NH \\ | \quad | \\ CH \quad C=S \\ | \quad | \\ O=S\!\!-\!\!-\!\!N\!\!-\!\!C_2H_5 \\ \| \\ O \end{array}$$

27.
$$O_2N\!\!-\!\!\bigcirc\!\!-\!\!\underset{ON}{}\!\!-\!\!N\!\!=\!\!N\!\!-\!\!\begin{array}{c} O=C\!\!-\!\!N\!\!-\!\!C_2H_5 \\ | \quad | \\ CH \quad C=O \\ | \quad | \\ O=S\!\!-\!\!-\!\!N\!\!-\!\!C_2H_5 \\ \| \\ O \end{array}$$

28.
$$O_2N\!\!-\!\!\bigcirc\!\!-\!\!\underset{OH}{}\!\!-\!\!N\!\!=\!\!N\!\!-\!\!\begin{array}{c} O=C\!\!-\!\!N\!\!-\!\!H \\ | \quad | \\ CH \quad C=S \\ | \quad | \\ O=S\!\!-\!\!-\!\!N\!\!-\!\!CH_2CH_2CH_3 \\ \| \\ O \end{array}$$

29.
$$O_2N\!\!-\!\!\bigcirc\!\!-\!\!\underset{SO_2NHC_2H_5}{}\!\!-\!\!N\!\!=\!\!N\!\!-\!\!\begin{array}{c} O=C\!\!-\!\!N\!\!-\!\!CH_2CH_2CH_3 \\ | \quad | \\ CH \quad C=S \\ | \quad | \\ O=S\!\!-\!\!-\!\!N\!\!-\!\!CH_2CH_2CH_3 \\ \| \\ O \end{array}$$

30.
$$O_2N\!\!-\!\!\bigcirc\!\!-\!\!\underset{OH}{}\!\!-\!\!N\!\!=\!\!N\!\!-\!\!\begin{array}{c} O=C\!\!-\!\!N\!\!-\!\!H \\ | \quad | \\ CH \quad C=S \\ | \quad | \\ O=S\!\!-\!\!-\!\!N\!\!-\!\!CH_2CH_2\!\!-\!\!OH \\ \| \\ O \end{array}$$

31.
$$O_2N\!\!-\!\!\bigcirc\!\!-\!\!\underset{SO_2CH_3}{}\!\!-\!\!N\!\!=\!\!N\!\!-\!\!\begin{array}{c} O=C\!\!-\!\!N\!\!-\!\!CH_2CH_2\!\!-\!\!OH \\ | \quad | \\ CH \quad C=S \\ | \quad | \\ O=S\!\!-\!\!-\!\!N\!\!-\!\!CH_2CH_2\!\!-\!\!OH \\ \| \\ O \end{array}$$

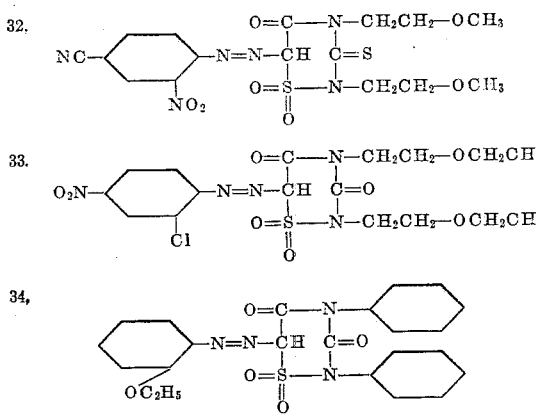

It will be understood that the examples given are intended to be illustrative and not limitative of my invention. As will be apparent to those skilled in the art, diazonium compounds prepared from any of the aromatic amines disclosed in the examples may be coupled with any of the coupling compounds disclosed herein, to form dye compounds of my invention.

In order that my invention may be fully understood the preparation of the coupling compounds employed herein is described hereinafter. From the following description, the preparation of any of the coupling compounds will be readily apparent.

The general procedure for preparing the new coupling compounds comprises reacting chlorosulfonylacetic acid ($HOOCCH_2SO_2Cl$) with a urea compound to form an ω-carboxymethylsulfonylurea compound. The compound thus obtained is esterified with ethanol to obtain an ω-carbethoxymethylsulfonylurea which cyclizes when treated with alcoholic sodium ethoxide to yield one of the heterocyclic coupling compounds employed herein to produce the azo dye compounds of my invention. The term urea as used above is used in its generic sense and embraces urea as well as thiourea compounds.

In order that the synthesis of the coupling compounds may be more easily visualized the following reactions are given:

1. Acylation:

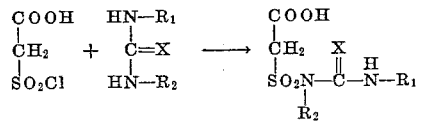

2. Esterification:

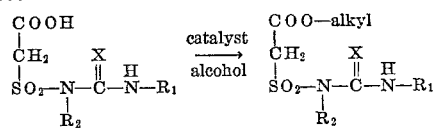

3. Ring closure:

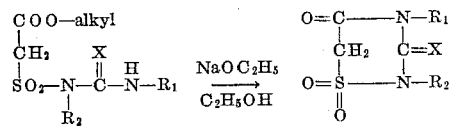

In the reactions indicated above, $R_1$, $R_2$ and $X$ have the meaning previously assigned to them.

I prefer to carry out step 1 by mixing together chlorosulfonylacetic acid and the desired urea compound in dry pyridine. After a heating period the solid product is isolated by distilling off the excess pyridine and washing out the pyridine hydrochloride with small portions of cold water. Purification of the product is unnecessary but may be accomplished, for example, by recrystallization from hot water if desired.

The esterification of step 2 is carried out using the well-known technique of azeotropic distillation. For this process a mixture of ethyl alcohol and benzene containing a small amount of an acidic catalyst such as toluene sulfonic acid is employed.

The resulting ester undergoes ring-closure in the presence of a basic condensing agent such as sodium ethylate in alcoholic solution.

The preparation of the coupling compounds is illustrated in detail by the following examples.

EXAMPLE A

Preparation of

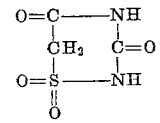

1. *Chlorosulfonylacetic acid*

100 grams of thioglycolic acid are added to 500 grams of a water-ice mixture and stirred well. Chlorine gas is passed into the mixture until a small sample taken no longer has the characteristic odor of thioglycolic acid. The mixture is then extracted with several 50 cc. portions of ether and the combined ether extracts are dried over anhydrous sodium sulfate. After removing the sodium sulfate by filtration, the ether is removed from the clear filtrate by evaporation. The residue, chlorosulfonylacetic acid may be purified by distillation under reduced pressure.

2. *N-ω-carboxymethylsulfonylurea*

158 grams of chlorosulfonylacetic acid are added to 100 grams of urea in 250 grams of anhydrous pyridine with agitation of the resulting reaction mixture. The temperature is raised to 100° C. over a period of ten hours and then to the boiling point of pyridine for thirty minutes. The excess pyridine is distilled off under reduced pressure, and the resulting solid material is washed with cold water to remove pyridine hydrochloride. If desired, the residue consisting essentially of N-ω-carboxymethylsulfonylurea

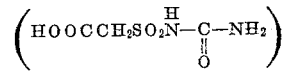

can be purified by recrystallization from hot water or aqueous ethyl alcohol.

3. *N-ω-carboxymethylsulfonylurea ethyl ester*

The product, obtained as described above, is transferred to a suitable flask containing one liter of benzene, 100 cc. of ethanol, and 10 grams of para-toluene sulfonic acid. The resulting mixture is distilled until no more water can be detected in small portions of distillate collected from time to time during the distillation. Esterification of the ω-carboxymethylsulfonylurea may then be assumed complete. At this point the residue is carefully neutralized with an aqueous sodium bicarbonate solution, and the excess ethyl alcohol together with benzene is removed by distillation. The residue is broken up, washed with water, and dried.

4. 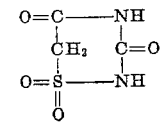

105 grams of the ester formed in 3 are added to 600 grams of absolute ethanol in which have previously been dissolved 11.5 grams of sodium. Ring closure is effected by heating the reaction mixture under reflux for seven to ten hours. Enough hydrochloric acid is then added to neutralize the sodium ethylate, and the hot solution is filtered to remove sodium chloride. After cooling, the precipitated product is collected by filtration, washed with cold water, and dried.

EXAMPLE B

Preparation of

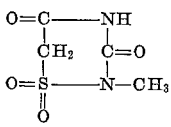

Steps 1, 2, 3, and 4 are carried out exactly as described under Example A with the exception that 123 grams of N-methylurea are substituted for 100 grams of urea in step 2. In the ring-closure step, 112 grams of the ester formed are used.

EXAMPLE C

Preparation of

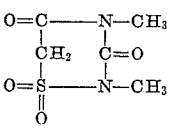

Steps 1, 2, 3, and 4 are carried out exactly as described in Example A with the exception that 146 grams of N,N'-dimethyl-urea are substituted for 100 grams of urea in step 2 and 119 grams of the ester formed are used in the ring-closure reaction.

Similarly the corresponding n-propyl disubstituted compound can be made by substituting 240 grams of N,N'-di-n-propylurea for the urea of Example A, in which case 147 grams of the ester formed are used in the ring-closure step.

EXAMPLE D

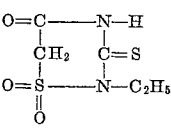

In place of the urea of Example A, 173 grams of N-ethyl-thiourea are substituted and reacted exactly in accordance with the procedure of Example A except that 127 grams of the ester formed are used in the ring closure reaction.

Similarly, the corresponding n-butyl substituted compound may be prepared by using 220 grams of N-n-butylthiourea in place of the urea of Example A. In this case 141 grams of the ester formed are used to carry out the ring closure step.

EXAMPLE E

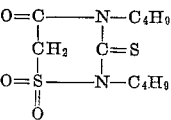

In place of urea 314 grams of N, N'-di-n-butyl-thiourea undergo the reactions of Example A to yield the above compound. In this case 169 grams of the ester formed are used in the ring closure step.

The corresponding ethyl disubstituted compound is prepared by employing 220 grams of N,N'-diethylthiourea in which case 141 grams of the ester formed is ring-closed.

EXAMPLE F

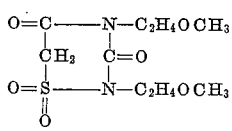

293 grams of N,N-di-β-methoxyethylurea are substituted for urea in Example A and reacted in exactly the same manner. 163 grams of the ester formed are used in the ring-closure step to obtain the compound shown above.

Similarly, 340 grams of N,N'-di-β-ethoxyethylurea yield the corresponding β-ethoxyethylurea disubstituted compound. In this case 177 grams of the ester formed are used in the ring-closure step.

EXAMPLE G

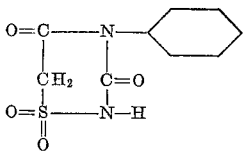

226 grams of N-phenylurea are substituted for the urea of Example A and reacted in exactly the same manner. 143 grams of the ester formed are used in the ring-closure step to obtain the compound believed to have the above formula.

Similarly, 250 grams of N-p-tolylurea yield the corresponding p-tolyl substituted compound. 150 grams of the ester formed are used in the ring-closure step.

EXAMPLE H

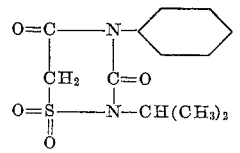

In place of urea in Example A, 323 grams of N-phenyl-N'-isopropylthiourea are substituted and reacted exactly in accordance with the procedure described therein. 172 grams of the ester formed are used in the ring closure step to obtain the compound believed to have the formula shown above.

Similarly, 347 grams of N-phenyl-N'-n-butylthiourea are employed to produce the corresponding phenyl-butyl disubstituted compound. 179 grams of the ester formed are used in the ring-closure step.

EXAMPLE I

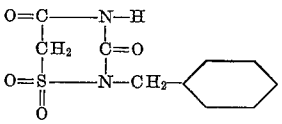

250 grams of N-benzylurea are substituted for the urea of Example A and reacted in exactly the same manner. 150 grams of the ester formed are used in the ring-closure step to obtain the compound believed to have the formula shown above.

The azo dye compounds of my invention are for the most part, relatively insoluble in water. Those compounds which are insoluble in water may be advantageously employed for the direct dyeing of textile materials by grinding the dye to a fine powder, intimately mixing with it a suitable dispersing or solubilizing agent, and adding the resulting mixture to water or a dilute solution of soap in water to form an aqueous dye bath.

Following this known preparation of the dye bath, the textile material or materials to be dyed may be added to the dye bath and the dyeing operation conducted in known fashion. The dye compounds of my invention which are water soluble do not, of course, require the use of a dispersing or solubilizing agent but may be applied to silk, wool (depending on the nature of the water-solubilizing group), cellulose alkyl carboxylic acid ester or nylon textile materials from an aqueous solution of the dye which may contain salt.

Suitable dispersing agents together with the amounts that may be employed are disclosed in McNally and Dickey Patent No. 2,115,030, issued April 26, 1938. The process disclosed in this patent for the dyeing of cellulose acetate silk can be used in applying the dyes of my invention to this material.

The heterocyclic coupling compounds used in the preparation of the new azo compounds of my invention are described and claimed in my copending application, Serial No. 787,620, filed November 22, 1947.

I claim:

1. The azo dye compounds having the formula:

$$\begin{array}{c} O=C\text{----}N\text{---}R_1 \\ | \quad\quad | \\ R\text{---}N=N\text{---}CH \quad C=X \\ | \quad\quad | \\ O=S\text{----}N\text{---}R_2 \\ \| \\ O \end{array}$$

wherein R represents a monocyclic aryl nucleus of the benzene series, $R_1$ and $R_2$ each stand for a member selected from the group consisting of a hydrogen atom, an alkyl group having one to four, inclusive, carbon atoms, a hydroxyalkyl group having two to three, inclusive, carbon atoms, an alkoxyalkyl group having three to four, inclusive, carbon atoms, the phenyl group, and the benzyl group, and X represents a member selected from the group consisting of an oxygen atoms and a sulfur atom.

2. The azo dye compounds having the formula:

$$\begin{array}{c} O=C\text{----}N\text{---}R_1 \\ | \quad\quad | \\ R\text{---}N=N\text{---}CH \quad C=O \\ | \quad\quad | \\ O=S\text{----}N\text{---}R_2 \\ \| \\ O \end{array}$$

wherein R represents a monocyclic aryl nucleus of the benzene series, $R_1$ and $R_2$ each stand for a member selected from the group consisting of a hydrogen atom, an alkyl group having one to four, inclusive, carbon atoms, a hydroxyalkyl group having two to three, inclusive, carbon atoms, an alkoxyalkyl group having three to four, inclusive, carbon atoms, the phenyl group, and the benzyl group.

3. The azo dye compounds having the formula:

$$\begin{array}{c} O=C\text{----}NH \\ | \quad\quad | \\ R\text{---}N=N\text{---}CH \quad C=O \\ | \quad\quad | \\ O=S\text{----}N\text{---}R_2 \\ \| \\ O \end{array}$$

wherein R represents a monocyclic aryl nucleus of the benzene series and $R_2$ stands for an alkyl group having one to four, inclusive, carbon atoms.

4. The azo dye compounds having the formula:

$$\begin{array}{c} O=C\text{----}NH \\ | \quad\quad | \\ R\text{---}N=N\text{---}CH \quad C=O \\ | \quad\quad | \\ O=S\text{----}NH \\ \| \\ O \end{array}$$

wherein R represents a monocyclic aryl nucleus of the benzene series.

5. The azo dye compound having the formula:

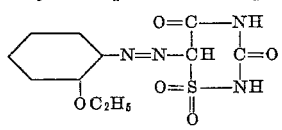

6. The azo dye compound having the formula:

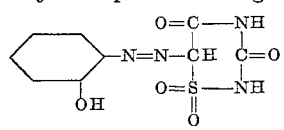

JOSEPH B. DICKEY.

REFERENCES CITED

The following references are of record in the file of this patent:

UNITED STATES PATENTS

| Number | Name | Date |
|---|---|---|
| 2,140,539 | McNally et al. | Dec. 20, 1938 |
| 2,338,728 | McNally et al. | Jan. 11, 1944 |

Certificate of Correction

Patent No. 2,466,397. April 5, 1949.

JOSEPH B. DICKEY

It is hereby certified that error appears in the printed specification of the above numbered patent requiring correction as follows:

Column 14, line 39, Example H, for that portion of the formula reading

"CH$_3$ $\overset{|}{\underset{|}{C}}$=O"   read   CH$_3$ $\overset{|}{\underset{|}{C}}$=S and that the said Letters Patent should be read with this correction therein that the same may conform to the record of the case in the Patent Office.

Signed and sealed this 25th day of October, A. D. 1949.

[SEAL]

THOMAS F. MURPHY,
*Assistant Commissioner of Patents.*